US010442456B2

(12) United States Patent
Davies et al.

(10) Patent No.: US 10,442,456 B2
(45) Date of Patent: Oct. 15, 2019

(54) ADJUSTABLE STEERING COLUMNS

(71) Applicant: TRW Limited, Solihull, West Midlands (GB)

(72) Inventors: Niclas Davies, Birmingham West Midland (GB); Michael Appleyard, Cheltenham Gloucestershire (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/327,665

(22) PCT Filed: Jul. 22, 2015

(86) PCT No.: PCT/GB2015/052117
§ 371 (c)(1),
(2) Date: Jan. 20, 2017

(87) PCT Pub. No.: WO2016/012788
PCT Pub. Date: Jan. 28, 2016

(65) Prior Publication Data
US 2017/0203780 A1      Jul. 20, 2017

(30) Foreign Application Priority Data
Jul. 22, 2014   (GB) .................................. 1412973.8

(51) Int. Cl.
*B62D 1/18*     (2006.01)
*B62D 1/185*    (2006.01)
(Continued)

(52) U.S. Cl.
CPC ............. *B62D 1/184* (2013.01); *B62D 1/185* (2013.01); *B62D 1/195* (2013.01)

(58) Field of Classification Search
CPC ........ B62D 1/184; B62D 1/185; B62D 1/187; B62D 1/195
See application file for complete search history.

(56) References Cited

U.S. PATENT DOCUMENTS 5,461,937 A    10/1995  Cymbal
5,893,676 A *   4/1999  Yamamoto ............. B62D 1/184
                                               403/321
(Continued)

FOREIGN PATENT DOCUMENTS

DE              10212263 A1 * 10/2003 ............. B62D 1/184
DE          102005035009 B3    12/2006
(Continued)

OTHER PUBLICATIONS

Patent Act 1977: Search Report under Section 17(5), Application No. GB1412973.8 dated Jan. 21, 2015.
(Continued)

*Primary Examiner* — Laura Freedman
(74) *Attorney, Agent, or Firm* — MacMillan, Sobanski & Todd, LLC

(57) ABSTRACT

An adjustable steering column assembly which includes an adjustable shroud that supports a steering column shaft, a support bracket that is fixed in position in the vehicle, and a clamp mechanism that selectively secures the shroud to the support bracket, the clamp mechanism comprising a fixed rack that is secured to the shroud or the bracket, and a moving rack that is movable towards and away from the fixed rack during operation of the clamp mechanism, in which the fixed rack comprises a support portion and at least one row of teeth which are carried by the support portion arranged spaced apart from one another, and the moving rack comprises a support portion and at least one row of teeth which are carried by the support portion. One or both of the support portion and teeth of the fixed rack are resiliently flexible so that in the event of moving from the first to the second position where a tooth-on-tooth situation arises the teeth of the moving block displace the teeth of the fixed block in the direction of movement of the moving rack so that the teeth of the moving rack can occupy the region (Continued)

that would otherwise be occupied by the teeth of the fixed rack teeth.

13 Claims, 3 Drawing Sheets

(51) Int. Cl.
*B62D 1/19* (2006.01)
*B62D 1/184* (2006.01)

(56) References Cited

U.S. PATENT DOCUMENTS

| | | | | |
|---|---|---|---|---|
| 6,092,955 | A * | 7/2000 | Chartrain | B62D 1/184 403/104 |
| 6,092,957 | A * | 7/2000 | Fevre | B62D 1/184 280/775 |
| 7,475,908 | B2 | 1/2009 | Senn | |
| 8,006,587 | B2 | 8/2011 | Schnitzer et al. | |
| 8,505,408 | B2 * | 8/2013 | Havlicek | B62D 1/195 280/775 |
| 9,168,945 | B2 * | 10/2015 | Hiesse | B62D 1/184 |
| 9,469,330 | B2 * | 10/2016 | Tanaka | B62D 1/184 |
| 9,580,100 | B2 * | 2/2017 | Tomiyama | B62D 1/184 |
| 9,604,663 | B2 * | 3/2017 | Tomiyama | B62D 1/184 |
| 9,718,490 | B2 * | 8/2017 | Tanaka | B62D 1/184 |
| 9,840,269 | B2 * | 12/2017 | Tanaka | B62D 1/189 |
| 9,840,270 | B2 * | 12/2017 | Tomiyama | B62D 1/184 |
| 2004/0057786 | A1 | 3/2004 | Heiml | |
| 2008/0185829 | A1 | 8/2008 | Senn | |
| 2009/0013817 | A1 | 1/2009 | Schnitzer et al. | |
| 2011/0210537 | A1 | 9/2011 | Uesaka | |

FOREIGN PATENT DOCUMENTS

| | | | | |
|---|---|---|---|---|
| EP | 2361816 | A2 | 8/2011 | |
| GB | 2456040 | A * | 7/2009 | B62D 1/184 |
| JP | 2017185874 | A * | 10/2017 | |
| WO | 0234607 | A1 | 5/2002 | |
| WO | 2008086548 | A1 | 7/2008 | |

OTHER PUBLICATIONS

PCT International Search Report and the Written Opinion, Application No. PCT/GB2015/052117 filed Jul. 22, 2015, dated Oct. 28, 2015.

* cited by examiner

ADJUSTABLE STEERING COLUMNS

CROSS-REFERENCE TO RELATED APPLICATIONS

This application is a national stage of International Application No. PCT/GB2015/052117, filed 22 Jul. 2015, the disclosures of which are incorporated herein by reference in entirety, and which claimed priority to Great Britain Patent Application No. 1412973.8 filed 22 Jul. 2014, the disclosures of which are incorporated herein by reference in entirety.

BACKGROUND OF THE INVENTION

The invention relates to adjustable steering column assemblies of the kind that use inter-engaging teeth for the purpose of positively locking the steering wheel at various up/down (rake) and/or in/out (reach) positions.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600N applied at the steering wheel before slipping.

However, it is increasingly a requirement from car manufacturers that there should be no substantial movement of the steering column assembly when forces of up to 6000N or 9000N or higher are applied. The objective is to prevent unwanted movements of the steering wheel in a crash so that the deployment of the air bag is ideally controlled.

For this, friction alone is often insufficient, as massive clamp forces would be needed to achieve this. Some method of Positive Locking is needed. Typically this involves the use of inter-engaging teeth.

There is a well-known problem with the type of "Positive-Locking" column which uses rows of inter-engaging teeth whereby, prior to operation of the locking lever by the driver, the selected steering wheel position has resulted in exact alignment of the tips of one row of teeth with those of the set of teeth with which they are supposed to engage. Inter-engaging of the teeth during the clamping operation is thereby blocked and, if excessive force is applied by the driver to the clamp lever to force it to complete its travel, permanent damage can occur to the tips of the teeth or the clamp mechanism. At the very least, such a Tooth-on-Tooth occurrence will require the driver to consciously re-release the lever, find a slightly different wheel position and then re-engage the lever. Unless special means are provided to overcome this problem, then it is likely to occur during 10% to 20% of all adjustment operations. This is undesirable.

BRIEF SUMMARY OF THE INVENTION

It is a feature of the present invention to provide a steering column assembly including a clamp mechanism that at least partially ameliorates this tooth-on-tooth problem.

Accordingly, the invention provides an adjustable steering column assembly which includes an adjustable shroud that supports a steering column shaft, a support bracket that is fixed in position in the vehicle, and a clamp mechanism that selectively secures the shroud to the support bracket, the clamp mechanism comprising a fixed rack that is secured to the shroud or the bracket, and a moving rack that is movable towards and away from the fixed rack during operation of the clamp mechanism, in which in a first unclamped position the teeth of the moving rack are spaced apart from the teeth of the fixed rack, and on moving to a second clamped position the teeth of the moving rack are moved towards the fixed rack so that in a normal non tooth-on-tooth condition the teeth of the fixed rack engage the teeth of the moving rack, thereby to selectively permit an amount of relative movement between the shroud and bracket that is required during reach and/or rake adjustment of the steering column assembly, in which:

the fixed rack comprises a support portion and at least one row of teeth which are carried by the support portion arranged spaced apart from one another, the moving rack comprises a support portion and at least one row of teeth which are carried by the support portion;

and characterised in that one or both of the support portion and teeth of the fixed rack are resiliently flexible so that in the event of moving from the first to the second position where a tooth-on-tooth situation arises the teeth of the moving block displace the teeth of the fixed block in the direction of movement of the moving rack so that the teeth of the moving rack can occupy the region that would otherwise be occupied by the teeth of the fixed rack teeth, the teeth of the fixed rack being retained in that position until subsequent displacement of the shroud relative to the bracket at which time the teeth of the fixed rack clear the teeth of the moving rack and move into engagement with the teeth of the moving rack.

Because the fixed rack can resiliently and flexibly move out of the way in a tooth-on-tooth condition, the moving teeth are always able to reach the correct second position when the clamp mechanism is locked even when a tooth-on-tooth situation is present. If the fixed rack teeth could not move in this way, the driver would be prevented from fully clamping the mechanism, or may cause permanent damage to the steering assembly.

By tooth-on-tooth condition we mean a situation in which the teeth of the fixed rack and teeth of the moving rack are aligned such that they do not interengage but instead collide, usually tip to tip. Similarly, a non tooth on tooth condition is one in which the teeth of the moving rack move into engagement with the teeth of the fixed rack, because the tips of the teeth are not aligned.

The fixed rack may be supported on a base plate which is fixed to the shroud or bracket and the fixed rack may comprise a support portion that engages the base plate and an engaging part that carries the rack of teeth. The base plate may be integrally formed with the support bracket or shroud.

The base plate may include a locating feature that securely locates a part of the fixed rack relative to the base plate.

The fixed rack may comprise a support portion that may be connected to at least one row of teeth through one or more flexible arms, the flexibility of the fixed rack being primarily provided by the flexibility of the arm or each of the arms. The deformation of the arms as they flex enables the teeth to all move together as a unit in the event of a tooth-on-tooth situation.

Each arm may function as a leaf spring, storing energy as it flexes which will subsequently be released to cause the fixed and moving racks to interengage as the shroud moves away from the tooth-on-tooth condition, for instance in the event of a crash.

The support portion, engaging portion and teeth of the fixed rack may be formed from a single component with the teeth at rest being spaced apart from the backing part and able to deflect resiliently towards the backing part.

The base plate may have a generally flat surface, and the fixed rack may support the teeth of the fixed rack in a position spaced apart from the base plate when the clamp mechanism is in the first position. This may be achieved by appropriate selection of the shape of the engaging part of the fixed rack or the shape of the teeth. In each case, the teeth should be able to deflect towards the base part when a tooth-on-tooth situation arises, by an amount sufficient to allow the teeth of the moving rack to adopt the second position.

For example, in one arrangement that fixed rack may comprise teeth that in a relaxed position are spaced out of the plane of a backing part that engages the base plate.

In an alternative, the base plate may be non-planar, for example bowed, to provide the required spacing between the base plate and the teeth of the fixed rack.

The row of teeth may therefore move as one relative to the base part, for instance due to flexing of arms that support it.

In an alternative, each tooth of the at least one row of teeth may be free to move independently relative to the base part. They may be each independently supported by a flexible root in a location spaced from the base plate when the clamp mechanism is in the first, unclamped, position.

In a practical arrangement, the fixed rack and the moving rack may each comprise two elongate rows of teeth that are spaced apart, preferably running parallel to one another. An elongate slot may be provided between the two rows, and the clamp mechanism may include a clamp pin that passes through the slot. A similar slot may be provided in the support bracket and/or the shroud through which the clamp pin passes.

Where a clamp pin is provided, the moving rack may move longitudinally relative to the axis of the clamp pin. It may be fixed to the clamp pin and move with the clamp pin between the first and second positions. Alternatively it may be free to slide along the clamp pin for movement between the first and second positions.

The two rows of teeth of the fixed rack may be interconnected by two flexible arms, one at each end of the rows, the slot where provided being located between the rows and the arms.

The arms may be bowed with a central portion midway between the rows being fixed to the base plate of the support bracket or shroud so that the teeth are held spaced apart from the base plate.

The flexible arms may be arranged to impart a small movement parallel to the axis of the rack when the arms are flexed.

The fixed rack may comprise a metal plate, with the slot formed in the centre of the plate, two opposing sides of the slot being shaped to form the rows of teeth, and the ends of the plate connecting the sides with the teeth forming the connecting arms.

The rows of teeth of the fixed and moving racks may extend in a direction parallel to a direction of desired movement of the shroud when the steering column assembly clamp mechanism is released. If the shroud is adjustable for reach, the rows of teeth may therefore generally extend parallel to the axis of the steering shaft. If it is adjustable for rake the rows of teeth may therefore generally extend parallel to the locus of movement of the clamp and may extend generally perpendicular to the axis of the steering shaft and generally vertically.

As the shroud is adjusted for rake, the moving rack will move in a direction parallel to the rows of teeth. As the shroud is adjusted for reach, the teeth of the moving rack (if fixed to the shroud) will move in a direction parallel to the rows of teeth.

The tips of the teeth of the fixed rack may generally face the tips of the teeth of the moving rack, being exactly aligned in a tooth-on-tooth condition and offset when not.

Alternatively, where each rack comprises two spaced apart rows, the tips of the teeth of one row of the fixed or moving rack may face the opposing row, whilst the tips of the teeth of the other of the fixed or moving rack may face away from the opposing row. In this arrangement, the sides of the teeth of the fixed rack will face the sides of the teeth of the moving rack, exactly when in tooth-on-tooth, and offset when not.

In each case, when in the second condition and interengaged the flanks of the fixed and moving racks will interact to provide the required positive locking.

Most preferably, each of the fixed rows of teeth lie in a common plane, and the moving rows of teeth also lie in a common plane, at least when in the first unclamped condition.

The teeth of the rows of teeth may all have the same pitch (the spacing from the tip of one tooth to the tip of an adjacent tooth. They may all have the same tooth height (measured from the throat to tip) so that they can be fully engaged.

The moving rack may comprise a block which includes an elongate slot through which a clamp bolt is passed, the clamp bolt also passing through an elongate slot in the fixed rack. The slot in the clamp block may be elongated in a direction 90 degrees from the direction in which the slot in the fixed rack extends. The length of the elongate slot in the clamp block may be selected to correspond to the maximum required side to side movement of the moving portion needed to enable tooth on tooth situation to be avoided. This may be equal to the tooth height where the spacing set out in the immediately preceding paragraph is provided.

The slot in the fixed rack may be at least as long as the required movement of the first and second portions relative to one another in rake and/or reach adjustment.

The slot in the fixed rack may lie between the two fixed rows of teeth on the fixed rack.

Each of the rows of teeth may comprise a linear rack of teeth with 2, 3, 4 or more teeth. However, if required the rows of teeth of the moving rack need not be linear. For example, the two rows of teeth of the moving portion may comprise teeth on opposing sides of a toothed wheel whose diameter determines the spacing between the moving rows.

The teeth may comprise saw shape teeth, or triangular shape teeth, or curvilinear shape teeth, or a mixture.

The moving rack may be moved between the first and second positions by a cam mechanism which may be located on the clamp bolt (where provided), a fixed head on an end of the bolt which provides a reaction face, and a return spring which biases the cam mechanism towards the support bracket.

The fixed rack may be secured to, or form part of the support bracket which is fixed relative to a shroud portion of the steering column assembly. The clamp pin, where provided, may comprise a part of or be fixed to a support bracket which is fixed in position relative to the body of the vehicle to which the steering assembly is fitted. As the clamp pin controls the movement of the moving rack, the moving rack may therefore be considered in one sense to be fixed relative to the support bracket.

The shroud portion may comprise a reach locking bracket, or rail, and may include an elongate slot through which the clamp bolt (where provided) passes which is aligned with the teeth of the fixed rack and also aligned with a direction of movement of the shroud portion for reach adjustment.

The support bracket may comprise a rake locking bracket and may include a slot through which the clamp bolt (where provided) passes which is aligned with the direction of movement of the shroud portion for rake adjustment.

The shroud may include a generally horizontal slot, and the rake bracket a generally vertical slot.

The invention may provide two fixed racks and two moving racks, one fixed rack secured to the shroud and the other the support bracket.

Where a clamp pin is provided, both moving racks may include an elongate slot through which the clamp pin passes, the elongate slots permitting the required side to side movement of the two moving racks.

The shroud may comprise an upper tubular shroud which may move telescopically relative to a lower tubular portion. The fixed rack may be secured to the upper tubular portion. In this case the clamp assembly locks the upper and lower portions together to control reach adjustment. Alternatively the fixed rack may be secured to the lower tubular shroud.

Where the steering assembly includes two fixed racks and two moving racks, both the fixed and moving racks may be formed as defined herein before, with one or both of the fixed racks being flexible to prevent damage in a tooth-on-tooth condition.

One of the fixed racks and moving racks may provide positive locking of the first and second portions of the steering assembly (for example for rake) and the other fixed rack and moving rack providing positive locking of the first portion to the third portion of the steering assembly (for example for reach).

The racks of teeth on each of the two moving racks may be arranged at approximately 90 degrees to one another. The teeth of the two fixed racks may also be at 90 degrees to one another to match the respective moving racks. For example, if the direction of movement for reach is horizontal and for rake vertical, the teeth of one fixed/moving rack pair may extend vertically and the other horizontally.

Other advantages of this invention will become apparent to those skilled in the art from the following detailed description of the preferred embodiments, when read in light of the accompanying drawings.

DETAILED DESCRIPTION OF THE INVENTION

Figure 1:
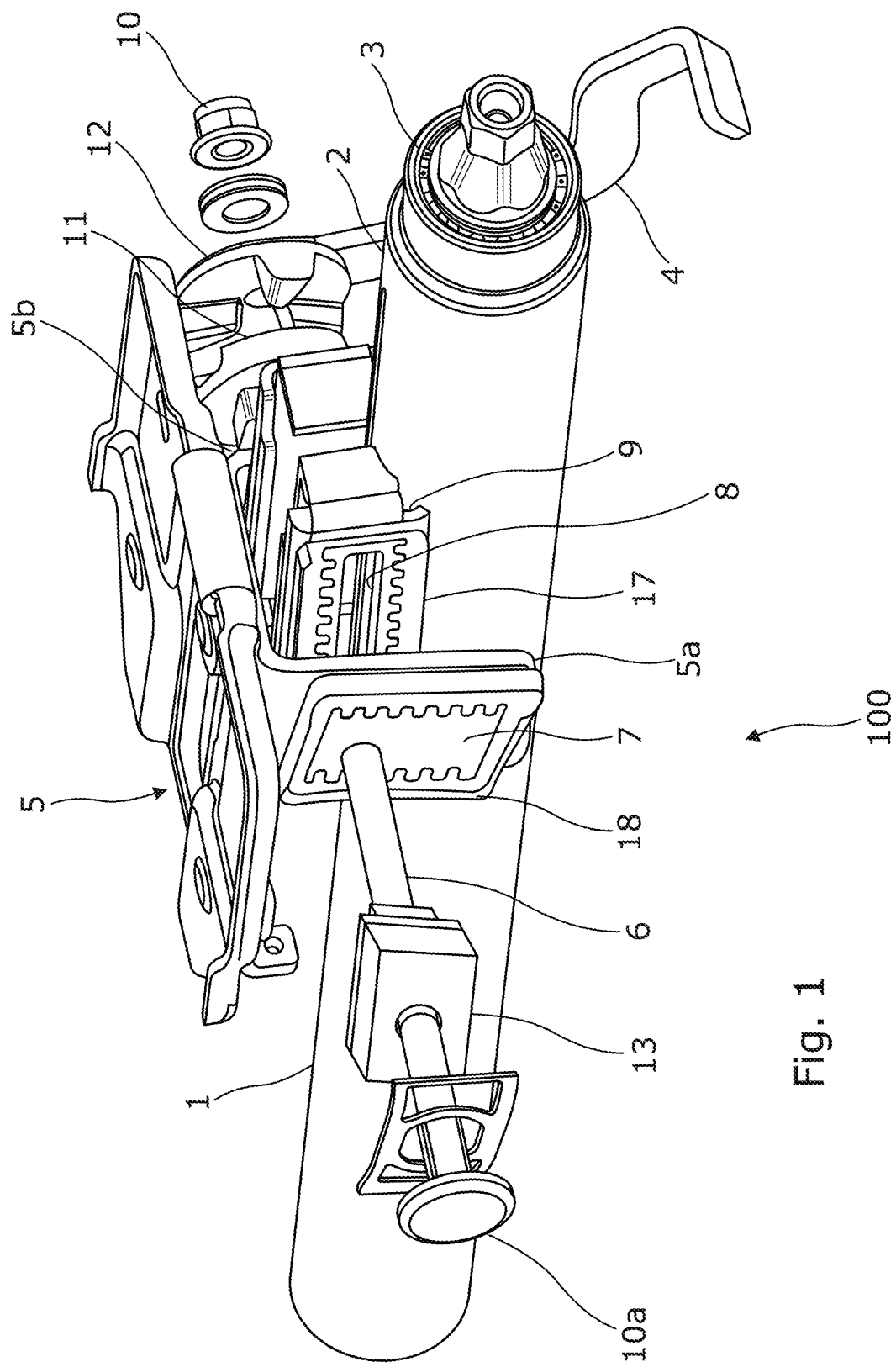
FIG. 1 is an isometric view of a part of an embodiment of a steering assembly in accordance with the present invention.

As shown in FIG. 1 of the accompanying drawings a column assembly 100 of the double adjustment type comprises a tubular shroud having a lower portion 1 and an upper portion 2 which can telescope relative to one another to allow for reach adjustment and which can both be moved in an arc around a pivot point axis (not shown but located to the left of the assembly as shown in FIG. 1) to allow for rake adjustment. The telescoping mechanism allows the adjustment of the Reach position by the driver and also allows the shroud to move forward in a controlled manner in the event of the steering wheel (not shown) being impacted by the driver in a crash. The tubular shroud supports a steering wheel shaft 3 via a bearing assembly. The end shown to the right in the Figure can be connected to a steering wheel of the vehicle.

The upper and lower shroud portions 2, 1 are fixed in position by a releasable clamp mechanism which is operated by a locking lever 4 that can be gripped by a driver. In a disengaged (unlocked, unclamped) position the upper shroud portion 2 is free to move telescopically along the lower shroud portion 1. When in the fully engaged (locked, clamped) position, the clamp mechanism secures the upper shroud portion 2 to a support bracket 5 by a positive locking of inter-engaged teeth so the shroud portions can no longer move telescopically. It is this telescopic sliding action that enables the axial, or "Reach", position of the steering wheel to be varied.

The lower shroud portion 1 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering device which itself is pivoted to the vehicle structure at the Rake Pivot Axis.

The support bracket 5 is secured to a fixed part of the vehicle, typically a cross beam located behind the dashboard of the vehicle. In this embodiment the support bracket 5 comprises an inverted U-shaped bracket which has two arms 5a, 5b which extend downwards on either side of the shroud in the region where the upper and lower tubular shrouds 2, 1 overlap. This support bracket 5 helps to prevent the steering column from moving side to side under load. In the locked position, the clamp assembly locks the upper and lower shroud portions in position between the arms of this bracket to prevent rake being altered.

The support Bracket 5 is bolted to a Mounting Bracket (not shown), and then to a part of the vehicle body, optionally with additional fusible connections (also not shown) acting between the Mounting Bracket and the Support Bracket 5 that in a crash are severed by the impact force of the driver striking the steering wheel. The support bracket then slides forwards in the car relative to the Mounting bracket.

The clamping mechanism is designed so that the one lever 4 simultaneously releases or locks the upper shroud portion 2 to the lower shroud portion 1 and the support bracket 5 in respect of both the Rake and the Reach directions. The clamping system comprises a clamp pin 6, which passes through a vertical slot 7 in each arm of the fixed support Bracket (which as mentioned previously is attached via the Mounting Bracket to the vehicle structure) and a horizontal slot 8 in a flange of a rail 9 which is attached to or otherwise integral with the upper shroud portion 2.

An adjusting nut 10 is provided at one end of the clamp pin and a diamond or hexagonal section head 10a at the other. Although not essential in all envisaged embodiments, it is also useful to prevent rotation of the clamp pin 6 in order to set the adjusting nut 10 during manufacture, without the need to temporarily clasp the clamp pin.

A cam mechanism 11, 12 is located on the clamp pin 6 between the nut 10 and the outer face of one of the arms of the support bracket 5. The cam mechanism comprises a pair of face-cams, or alternative, one of which 11 is prevented from rotating while the other 12 is attached to a clamp lever 4. The length of the cam mechanism (along the axis of the bolt) can be adjusted by rotation of the lever 4. As the cam assembly lengthens when the lever is rotated to a locked position, it applies tension to the clamp bolt, drawing the cap 9a towards the arms and so squeezing the arms of the support bracket onto the sides of the rail.

Located between the other arm of the bracket (opposite side to the cam mechanism) and the cap 10a of the clamp pin 6 is a pair of moving racks. This comprises a block 13 that is provided with a hole 14 through which the clamp pin passes. It is free to slide along the clamp pin. Note that in other arrangements this block could be provided on the same end of the clamp pin 6 as the cam, and indeed could be integrally formed with a part of the cam.

Figure 2:
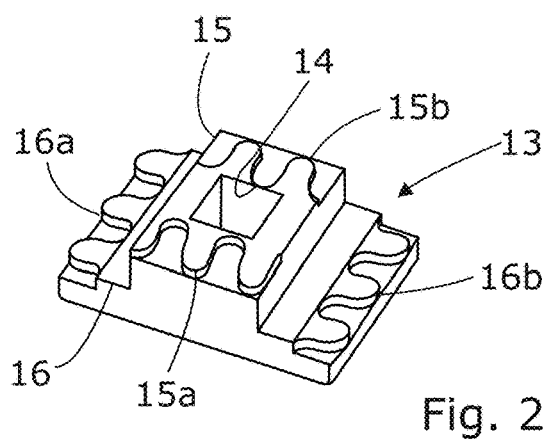
FIG. 2 is a view of the stepped block that defines the first and second moving racks of the clamp mechanism of the steering assembly of FIG. 1.

The block is shown more clearly in FIG. 2 and carries two moving racks 15, 16, each rack comprising two rows of teeth 15a, 15b, 16a, 16b arranged in parallel with each other and with each row comprising teeth whose tips face outwards away from the other row of the rack away from the clamp pin. In this arrangement, the sides of each of the teeth (not to be confused with the flanks) will face the support bracket arm, i.e. face away from the cap 10a. They could, in a different arrangement within the scope of the invention be arranged so that the tips of the teeth face the support bracket. The two racks of teeth are provided at different heights on the block by forming a stepped profile to the sides of the block.

This stepped block arrangement may comprise a metal, metal composite, or fibre reinforced composite block that is cut, stamped, pressed or otherwise shaped to provide the required tooth forms. It is relatively rigid so that in use the teeth do not flex relative to the rest of the block.

The two racks cooperate with respective fixed racks 17, 18 supported by the support bracket arm 7a and rail 9 that is secured to the shroud. A first fixed rack 17 sits upon a base plate provided on the rail around the elongate slot 8 that extends axially along the shroud. The clamp pin 6 passes through this slot 8 and through the fixed rack.

The first fixed rack 17 comprises a support part that contacts the base plate, and two rows of teeth located either side of a slot through which the clam pin passes. Each of the rows of teeth extend in line with the axis of the slot, one each side of the slot, and have teeth whose tips face the tips of the teeth of the other row. In this alignment the end faces (i.e. the faces orthogonal to the flanks and tips of the teeth) will face out towards the clamp block. This rack cooperates with the first moving rack 15.

In addition to the first fixed rack 17, a second fixed rack 18 is provided. This is similar to the first fixed rack 17 in that it has two rows of teeth that face outwards from each other and an elongate slot through which the clamp pin 6 passes. However, everything is rotated through 90 degrees, so that the rows of teeth are orthogonal to those of the first fixed rack. The teeth of this second fixed rack co-operate with the second moving rack. The second fixed rack is supported by a base plate on the support bracket arm 5a and comprises a support part and two rows of teeth, one each side of the slot in the support bracket.

The stepped block that defines the two moving racks is sized relative to the slot in the bracket 5a so that the teeth of the first moving rack 15 pass through the slot to be able to contact the first fixed rack 17, whereas the teeth of the second moving rack 16 overlay the teeth of the second fixed rack 18 either side of the slot in the bracket.

Each of the fixed racks 17, 18 is provided with some flexibility, whereby the fixed teeth can move relative to the respective base plate in a direction that is along the axis of the clamp pin, although any movement orthogonal to this direction should be restricted. The teeth are in effect spring loaded so they can move but will spring back when any force applied to them is released. The amount of allowed movement and force should be low enough that it can be overcome by a user operating the lever. The amount of movement should correspond to at least the depth of the teeth of the fixed rack of moving rack, or substantially correspond to the amount of movement of the moving rack when operating the clamp mechanism.

The teeth of the moving racks 15, 16, on the other hand, should not be flexible in a preferred arrangement. For instance, the moving racks may comprise blocks that are machined to define the teeth.

A release spring (not shown) is slid on to the clamp pin 6 so it is partially sandwiched between the stepped block 13 and the support bracket arm. The function of the Release Spring is to urge the diamond/hexagonal section 10a of the Clamp pin 6 away from the Support bracket 5, and with it also urge the block away from the fixed racks.

The clamp mechanism operates in the following manners. When the Cam is rotated to the unclamped position, by moving the lever, the teeth of the two moving racks 15,16 are all held clear of the teeth of the fixed racks 17,18 (secured to the mount bracket and reach bracket). The first portion (upper column shroud 3) can therefore be adjusted for rake (moving the clamp bolt up and down the vertical slot in the rake bracket) and reach (moving the clamp bolt back and forth along the horizontal slot in the reach bracket). This is the first position of the clamp mechanism.

When the Cam is rotated from the unclamped position towards a second, clamped position, it starts to move away from the support Bracket arm due to its interaction with the profiled face of the fixed Cam and so the cap 10a of the Clamp Bolt 6 is moved towards the support Bracket 5. This causes the stepped block that carries the teeth of the moving Racks 15, 16 to approach the teeth of the Fixed Racks 17, 18.

If the teeth of the fixed and moving racks are offset, so that the tips are not aligned, the moving rack will move into position between the teeth of the fixed rack, providing a positive locking as the clamp mechanism settles into the second clamped position.

If the teeth of a fixed rack 17, 18 are aligned with the teeth of the corresponding moving rack 15, 16 a so called tooth-on-tooth condition, the moving rack will apply a force to the fixed rack causing it to flex and the teeth of the fixed rack to move towards the base past of the support bracket or rail (depending which fixed rack is in the tooth on tooth condition). This can occur without damage due to the fixed rack being flexible. The assembly will rest in its fully locked position without fixed and moving rack teeth engaged, and instead pushing against one another.

When a crash occurs which causes the shroud to move, the teeth will move out of the tooth-on-tooth condition. The fixed rack teeth 17, 18 will then flex back into a position where they interlock with the moving rack teeth 15, 16. This movement is along the axial direction of the clamp pin. Once engaged, a positive locking will be restored.

To achieve the flexibility of the teeth of the fixed rack a number of different arrangements may be selected. These are shown in FIGS. 3 and 4 of the accompanying drawings.

Figure 3:
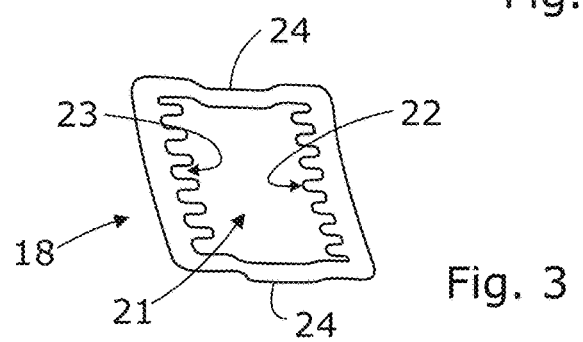
FIG. 3 is a view from above and to one side of a first embodiment of a fixed rack.

In a first arrangement 18 shown in FIG. 3 a fixed rack comprises a shaped metal plate that has a central cut out 21 defining the elongate slot. Two opposing edges of the slot are shaped to define the two rows of teeth 22, 23, each row comprising teeth of equal pitch and height. The ends of the slot, that connect the sides with the two rows of teeth, form bow shaped arms 24. The centre part of each bow shaped arm forms the support part of the fixed rack, and sit upon the base plate formed on the support bracket or shroud rail. Because the arms 24 are bowed the two rows of teeth are held above the base part. When flexing, during tooth-on-tooth, the arms flex so that bowing is reduced or removed. Because the fixed rack is formed from a metal plate the arms are springy and can flex without plastic deformation occurring, allowing them to spring back. Of course, a similar effect could be achieved using other non-metal materials or metal composites.

As shown the bow is formed by a number of steps in each arm, although if preferred a smoothly curved bow shape could be provided.

Figure 4:
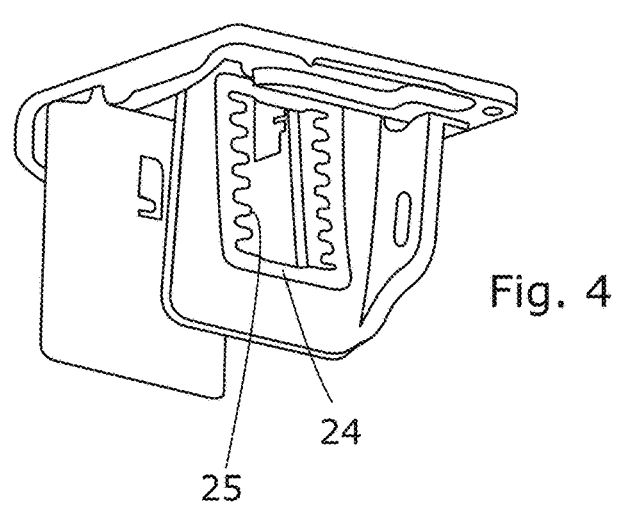
FIG. 4 shows the rack of FIG. 3 in position.

The fixed rack is located on a flat base plate 25 of the support bracket as shown in FIG. 4, the bowed arms 24 holding the rows of teeth away from the base plate. As shown this base plate forms a part of the support bracket but it could form part of the rail on the shroud. The spacing allows the rows of teeth of the fixed rack to be pushed out of position when a tooth on tooth occurs, primarily by a deformation of the bowed arms.

Figure 5:
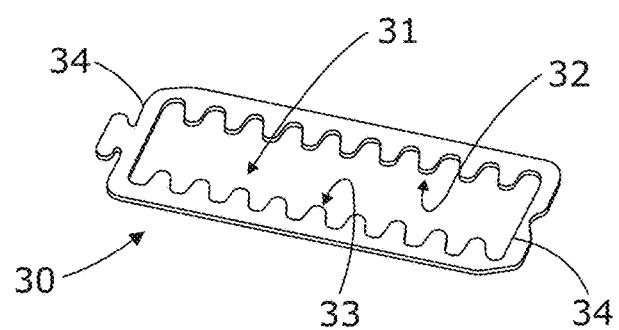
FIG. 5 is a view from above and to one side of a second embodiment of a fixed rack.
Figure 7:
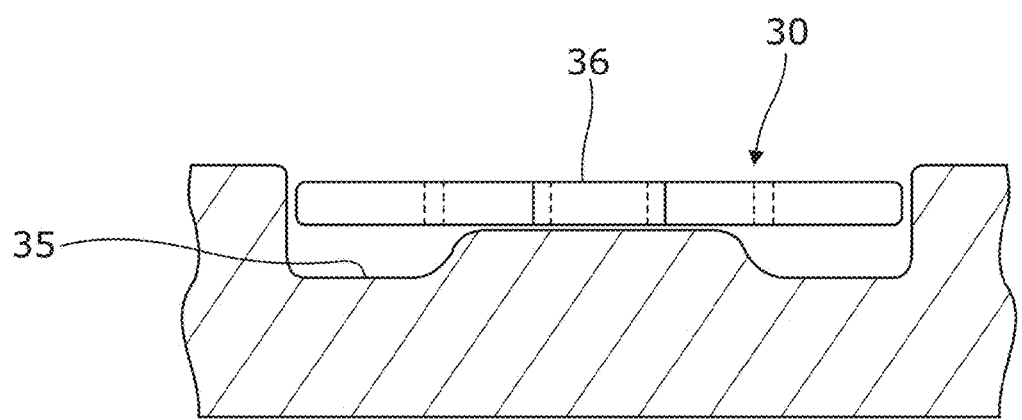
FIG. 7 shows the second embodiment of the fixed rack in its position of use.

An alternative fixed rack 17 is shown in FIG. 5. This fixed rack 30 also comprises a metal plate, with a central cut out forming a slot 31, and two rows of teeth 32, 33 formed in the sides of the slot. The arms 34 at the end of the slot in this arrangement are not bowed and the whole plate lies in a single plane. To allow the teeth to be spaced from the base plate, the whole base part is bowed, or stepped, so that it is higher at the centre of the arms and lower at the sides. Thus, the flat fixed rack when supported by the base part holds the rows of teeth spaced apart from the base part. This is shown in FIG. 7 of the drawings which is a cross section through the base plate 35 and fixed rack 30. As the moving rack moves into the second, clamped position, under tooth on tooth conditions, it may push the two rows of teeth down towards the base plate. The fixed rack, being springy, flexes and yet can spring back as soon as the tooth on tooth condition is overcome.

Of course, a hybrid of the two arrangements is possible where the arms are curved and also the base plate is bowed or stepped as well.

In each case, the spacing of the rows of teeth from the base part corresponds at least to the thickness of the teeth of the fixed rack, so that they can deflect out of their normal position during tooth on tooth to allow the teeth of the corresponding moving rack to move to their normal clamped position.

Also shown in FIGS. 4 and 7, one of the arms is provided with a small outwardly extending key 36 which fits within a correspondingly shaped cut out in a raised wall that surrounds the base plate. The location of the key in the cut out positively locates the fixed rack 30 and prevents any unwanted side to side movement. A similar cut-out in the other arm cooperates with a key on the raised wall. These two features ensure the fixed rack can only be located in one orientation.

Figure 6:
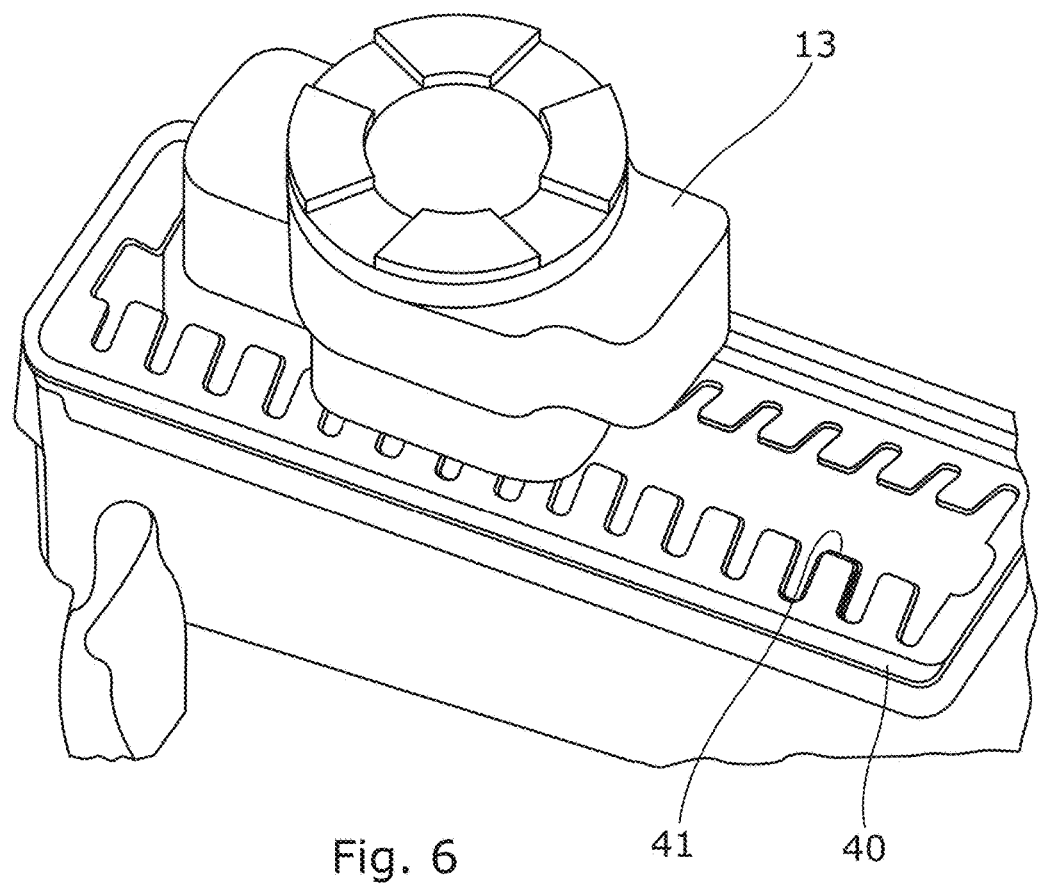
FIG. 6 shows an alternative, third, arrangement of a fixed rack.

In a still further alternative arrangement, rather than the rows of teeth moving by flexing of the arms that connect them, each tooth may be shaped so that it is individually able to flex. This is shown, for example, in the arrangement of FIG. 6. Here, the fixed rack 40 comprises a flat plate, again typically metal, that has a central slot, the sides of the slots again being shaped to form teeth. However, now each tooth 41 is bent so that the tip of the tooth is displaced out of the plane of the root of the tooth where it connects to the rest of the plate. This means the tip of the tooth 41 is spaced apart from the base plate on which the fixed rack is supported. In the tooth on tooth condition, each of the teeth that contact the teeth of the moving rack can be bent down towards the base plate, the other teeth not being so bent.

The teeth 41, as well as being bent, should be flexible and springy so that they push back to their rest position when the tooth on tooth condition is removed.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column assembly which includes an adjustable shroud that supports a steering column shaft, a support bracket that is fixed in position in a vehicle, and a clamp mechanism that selectively secures the shroud to the support bracket, the clamp mechanism comprising a fixed rack that is secured to the shroud or the support bracket, and a moving rack that is movable towards and away from the fixed rack during operation of the clamp mechanism, in which in a first unclamped position teeth of the moving rack are spaced apart from teeth of the fixed rack, and on moving to a second clamped position the teeth of the moving rack are moved towards the fixed rack so that in a normal non tooth-on-tooth condition the teeth of the fixed rack engage the teeth of the moving rack, thereby to selectively permit an amount of relative movement between the shroud and support bracket that is required during reach and/or rake adjustment of the steering column assembly, in which:

the fixed rack comprises a support portion and at least one row of teeth which are carried by the support portion arranged spaced apart from one another, the moving rack comprises a support portion and at least one row of teeth which are carried by the support portion of the moving rack;

wherein the support portion of the fixed rack is resiliently flexible so that in the event of moving from the first to the second position where a tooth-on-tooth situation arises the teeth of the moving rack displace the teeth of the fixed rack in the direction of movement of the moving rack by flexion of the support portion so that the teeth of the moving rack can occupy a region that would otherwise be occupied by the teeth of the fixed rack, the teeth of the fixed rack being retained in that position until subsequent displacement of the shroud relative to the support bracket at which time the teeth of the fixed rack clear the teeth of the moving rack and move into engagement with the teeth of the moving rack.

2. The adjustable steering column assembly according to claim 1 in which the fixed rack is supported on a base plate which is fixed to the shroud or support bracket and the fixed rack support portion engages the base plate and an engaging part that carries the fixed rack teeth.

3. The adjustable steering column assembly according to claim 2 in which the base plate includes a locating feature that securely locates a part of the fixed rack relative to the base plate.

4. The adjustable steering column assembly according to claim 2, in which the support portion, engaging part and teeth of the fixed rack are formed from a single component with the teeth at rest being spaced apart from the base plate and able to deflect resiliently towards the base plate.

5. The adjustable steering column assembly according to claim 2, in which the base plate has a generally flat surface, and the fixed rack supports the teeth of the fixed rack in a position spaced apart from the base plate when the clamp mechanism is in the first position.

6. The adjustable steering column assembly according to claim 2, in which the base plate is non-planar, to provide a spacing between the base plate and the teeth of the fixed rack.

7. The adjustable steering column assembly according to claim 1 in which the fixed rack support portion is connected to at least one row of teeth through one or more flexible arms, the flexibility of the fixed rack being primarily provided by the flexibility of the arm or each of the arms.

8. The adjustable steering column assembly according to claim 7 in which each arm functions as a leaf spring, storing energy as it flexes which will subsequently be released to cause the fixed and moving racks to interengage as the shroud moves away from the tooth-on-tooth condition.

9. The adjustable steering column assembly according to claim 1 in which the fixed rack and the moving rack each comprise two elongate rows of teeth that are spaced apart, in which an elongate slot is provided between the two rows, and the clamp mechanism includes a clamp pin that passes through the slot.

10. The adjustable steering column assembly according to claim 9 in which the moving rack is free to move longitudinally relative to an axis of the clamp pin.

11. The adjustable steering column assembly according to claim 9 in which the two rows of teeth of the fixed rack are interconnected by two flexible arms, one at each end of the rows, the slot where provided being located between the rows and the arms.

12. The adjustable steering column assembly according to claim 11 in which the arms are bowed with a central portion midway between the rows being fixed to the base plate of the support bracket or shroud so that the teeth are held spaced apart from the base plate.

13. The adjustable steering column assembly according to claim 9 in which the two elongate rows of teeth run parallel to one another.

* * * * *